US007744002B2

(12) United States Patent  (10) Patent No.: US 7,744,002 B2
Jones et al.  (45) Date of Patent: Jun. 29, 2010

(54) TAMPER EVIDENT ADHESIVE AND IDENTIFICATION DOCUMENT INCLUDING SAME

(75) Inventors: Robert L. Jones, Andover, MA (US); Daoshen Bi, Boxborough, MA (US); Tung-Feng Yeh, Waltham, MA (US)

(73) Assignee: L-1 Secure Credentialing, Inc., Billierca, MA (US)

( * ) Notice: Subject to any disclaimer, the term of this patent is extended or adjusted under 35 U.S.C. 154(b) by 143 days.

(21) Appl. No.: 11/078,655

(22) Filed: Mar. 11, 2005

(65) Prior Publication Data

US 2005/0242194 A1 Nov. 3, 2005

Related U.S. Application Data

(60) Provisional application No. 60/552,172, filed on Mar. 11, 2004.

(51) Int. Cl.
*G06K 19/00* (2006.01)
(52) U.S. Cl. .................... 235/487; 235/380; 235/488
(58) Field of Classification Search ................ 235/487, 235/380, 375, 488; 428/347
See application file for complete search history.

(56) References Cited

U.S. PATENT DOCUMENTS

| 2,815,310 | A |  | 12/1957 | Anderson |
| 3,225,457 | A |  | 12/1965 | Schure |
| 3,413,171 | A |  | 11/1968 | Hannon |
| 3,496,262 | A |  | 2/1970 | Long et al. |
| 3,569,619 | A |  | 3/1971 | Simjiam |
| 3,582,439 | A |  | 6/1971 | J.F. Thomas |
| 3,614,839 | A |  | 10/1971 | J.F. Thomas |
| 3,665,162 | A |  | 5/1972 | Yamamoto et al. |
| 3,676,054 | A | * | 7/1972 | Symm .......................... 8/191 |
| 3,703,628 | A |  | 11/1972 | Philipson, Jr. |
| 3,758,970 | A |  | 9/1973 | Annenberg |
| 3,805,238 | A |  | 4/1974 | Rothfjell |
| 3,838,444 | A |  | 9/1974 | Loughlin et al. |
| 3,845,391 | A |  | 10/1974 | Crosby |
| 3,914,877 | A |  | 10/1975 | Hines |

(Continued)

FOREIGN PATENT DOCUMENTS

CA 2235002 12/1998

(Continued)

OTHER PUBLICATIONS

"Access Control and Copyright Protection for Images, WorkPackage 3: Evaluation of Existing Systems," Apr. 19, 1995, 68 pages.

(Continued)

*Primary Examiner*—Edwyn Labaze
(74) *Attorney, Agent, or Firm*—Mintz, Levin, Cohn, Ferris, Glovsky and Popeo, P.C.

(57) ABSTRACT

A composition is provided for adhering a first article to a second article, the composition comprising a thermally active low Tg polymeric resin; and a multifunctional crystalline polymer. The thermally active low Tg polymeric resin can, for example, comprise 50-99% of the composition. The multifunctional crystalline polymer can, for example, comprise 1-50% of the composition. In one embodiment, the multifunctional crystalline polymer comprises 5-20% by weight of the composition. In one embodiment, the multifunctional crystalline polymer has a low molecular weight.

21 Claims, 3 Drawing Sheets

U.S. PATENT DOCUMENTS

| | | | |
|---|---|---|---|
| 3,922,074 A | 11/1975 | Ikegami | |
| 3,929,701 A | 12/1975 | Hall et al. | |
| 3,949,501 A | 4/1976 | Andrews et al. | |
| 3,953,869 A | 4/1976 | Lo et al. | |
| 3,961,956 A | 6/1976 | Fukuda et al. | |
| 3,984,624 A | 10/1976 | Waggener | |
| 4,027,345 A | 6/1977 | Fujisawa et al. | |
| 4,082,873 A | 4/1978 | Williams | |
| 4,096,015 A | 6/1978 | Kawamata et al. | |
| 4,121,003 A | 10/1978 | Williams | |
| 4,155,618 A | 5/1979 | Regnault et al. | |
| 4,184,701 A | 1/1980 | Franklin et al. | |
| 4,225,967 A | 9/1980 | Miwa et al. | |
| 4,230,990 A | 10/1980 | Lert, Jr. et al. | |
| 4,231,113 A | 10/1980 | Blasbalg | |
| 4,238,849 A | 12/1980 | Gassmann | |
| 4,252,995 A | 2/1981 | Schmidt et al. | |
| 4,304,809 A | 12/1981 | Moraw et al. | |
| 4,313,197 A | 1/1982 | Maxemchuk | |
| 4,313,984 A | 2/1982 | Moraw et al. | |
| 4,324,421 A | 4/1982 | Moraw et al. | |
| 4,356,052 A | 10/1982 | Moraw et al. | |
| 4,362,775 A | 12/1982 | Yabe et al. | |
| 4,367,488 A | 1/1983 | Leventer et al. | |
| 4,379,947 A | 4/1983 | Warner | |
| 4,380,027 A | 4/1983 | Leventer et al. | |
| 4,395,600 A | 7/1983 | Lundy et al. | |
| 4,415,225 A | 11/1983 | Benton et al. | |
| 4,417,784 A | 11/1983 | Knop et al. | |
| 4,423,415 A | 12/1983 | Goldman | |
| 4,425,642 A | 1/1984 | Moses et al. | |
| 4,428,997 A | 1/1984 | Shulman | |
| 4,476,468 A | 10/1984 | Goldman | |
| 4,522,670 A | 6/1985 | Caines | |
| 4,528,588 A | 7/1985 | Lofberg | |
| 4,532,508 A | 7/1985 | Ruell | |
| 4,547,804 A | 10/1985 | Greenberg | |
| 4,553,261 A | 11/1985 | Froessl | |
| 4,590,366 A | 5/1986 | Rothfjell | |
| 4,595,950 A | 6/1986 | Lofberg | |
| 4,614,619 A | 9/1986 | Shannon | |
| 4,621,271 A | 11/1986 | Brownstein | |
| 4,637,051 A | 1/1987 | Clark | |
| 4,637,896 A | 1/1987 | Shannon | |
| 4,653,775 A | 3/1987 | Raphael et al. | |
| 4,653,862 A | 3/1987 | Morozumi | |
| 4,654,867 A | 3/1987 | Labedz et al. | |
| 4,660,221 A | 4/1987 | Dlugos | |
| 4,663,518 A | 5/1987 | Borror et al. | |
| 4,665,431 A | 5/1987 | Cooper | |
| 4,672,605 A | 6/1987 | Hustig et al. | |
| 4,675,746 A | 6/1987 | Tetrick et al. | |
| 4,677,435 A | 6/1987 | Causse D'Agraives et al. | |
| 4,682,794 A | 7/1987 | Margolin | |
| 4,689,477 A | 8/1987 | Goldman | |
| 4,703,476 A | 10/1987 | Howard | |
| 4,711,690 A | 12/1987 | Haghiri-Tehrani | |
| 4,712,103 A | 12/1987 | Gotanda | |
| 4,718,106 A | 1/1988 | Weinblatt | |
| 4,738,949 A | 4/1988 | Sethi et al. | |
| 4,739,377 A | 4/1988 | Allen | |
| 4,750,173 A | 6/1988 | Bluthgen | |
| 4,765,656 A | 8/1988 | Becker et al. | |
| 4,765,999 A | 8/1988 | Winter | |
| 4,773,677 A | 9/1988 | Plasse | |
| 4,775,901 A | 10/1988 | Nakano | |
| 4,776,013 A | 10/1988 | Kafri et al. | |
| 4,805,020 A | 2/1989 | Greenberg | |
| 4,807,031 A | 2/1989 | Broughton et al. | |
| 4,811,357 A | 3/1989 | Betts et al. | |
| 4,811,408 A | 3/1989 | Goldman | |
| 4,820,912 A | 4/1989 | Samyn | |
| 4,835,517 A | 5/1989 | Van der Gracht et al. | |
| 4,855,827 A | 8/1989 | Best | |
| 4,864,618 A | 9/1989 | Wright et al. | |
| 4,866,771 A | 9/1989 | Bain | |
| 4,869,946 A | 9/1989 | Clay | |
| 4,876,123 A | 10/1989 | Rivera et al. | |
| 4,876,617 A | 10/1989 | Best et al. | |
| 4,879,747 A | 11/1989 | Leighton et al. | |
| 4,884,139 A | 11/1989 | Pommier | |
| 4,888,798 A | 12/1989 | Earnest | |
| 4,889,749 A | 12/1989 | Ohashi et al. | |
| 4,903,301 A | 2/1990 | Kondo et al. | |
| 4,908,836 A | 3/1990 | Rushforth et al. | |
| 4,908,873 A | 3/1990 | Philibert et al. | |
| 4,921,278 A | 5/1990 | Shiang et al. | |
| 4,935,335 A | 6/1990 | Fotland | |
| 4,939,515 A | 7/1990 | Adelson | |
| 4,941,150 A | 7/1990 | Iwasaki | |
| 4,943,973 A | 7/1990 | Werner | |
| 4,943,976 A | 7/1990 | Ishigaki | |
| 4,944,036 A | 7/1990 | Hyatt | |
| 4,947,028 A | 8/1990 | Gorog | |
| 4,963,998 A | 10/1990 | Maufe | |
| 4,965,827 A | 10/1990 | McDonald | |
| 4,967,273 A | 10/1990 | Greenberg | |
| 4,968,063 A | 11/1990 | McConville et al. | |
| 4,969,041 A | 11/1990 | O'Grady et al. | |
| 4,972,471 A | 11/1990 | Gross et al. | |
| 4,972,476 A | 11/1990 | Nathans | |
| 4,977,594 A | 12/1990 | Shear | |
| 4,979,210 A | 12/1990 | Nagata et al. | |
| 4,993,068 A | 2/1991 | Piosenka et al. | |
| 4,996,530 A | 2/1991 | Hilton | |
| 5,005,873 A | 4/1991 | West | |
| 5,010,405 A | 4/1991 | Schreiber et al. | |
| 5,023,907 A | 6/1991 | Johnson | |
| 5,024,989 A | 6/1991 | Chiang et al. | |
| 5,027,401 A | 6/1991 | Soltesz | |
| 5,036,513 A | 7/1991 | Greenblatt | |
| 5,053,956 A | 10/1991 | Donald | |
| 5,058,926 A | 10/1991 | Drower | |
| 5,060,981 A | 10/1991 | Fossum et al. | |
| 5,063,446 A | 11/1991 | Gibson | |
| 5,066,947 A | 11/1991 | DuCastel | |
| 5,073,899 A | 12/1991 | Collier et al. | |
| 5,079,648 A | 1/1992 | Maufe | |
| 5,086,469 A | 2/1992 | Gupta et al. | |
| 5,087,507 A | 2/1992 | Heinzer | |
| 5,095,196 A | 3/1992 | Miyata | |
| 5,103,459 A | 4/1992 | Gilhousen et al. | |
| 5,113,445 A | 5/1992 | Wang | |
| 5,113,518 A | 5/1992 | Durst | |
| 5,128,779 A | 7/1992 | Mallik | |
| 5,138,712 A | 8/1992 | Corbin | |
| 5,146,457 A | 9/1992 | Veldhuis et al. | |
| 5,148,498 A | 9/1992 | Resnikoff | |
| 5,150,409 A | 9/1992 | Elsner | |
| 5,161,210 A | 11/1992 | Druyvesteyn et al. | |
| 5,166,676 A | 11/1992 | Milheiser | |
| 5,169,707 A | 12/1992 | Faykish et al. | |
| 5,171,625 A | 12/1992 | Newton | 428/195 |
| 5,181,786 A | 1/1993 | Hujink | |
| 5,185,736 A | 2/1993 | Tyrrell et al. | |
| 5,199,081 A | 3/1993 | Saito et al. | |
| 5,200,822 A | 4/1993 | Bronfin et al. | |
| 5,212,551 A | 5/1993 | Conanan | |
| 5,213,337 A | 5/1993 | Sherman | |
| 5,216,543 A | 6/1993 | Calhoun | |
| 5,228,056 A | 7/1993 | Schilling | |
| 5,237,164 A | 8/1993 | Takada | |
| 5,243,423 A | 9/1993 | DeJean et al. | |
| 5,245,329 A | 9/1993 | Gokcebay | |

| | | | | | |
|---|---|---|---|---|---|
| 5,249,546 A | 10/1993 | Pennelle | 5,579,694 A | 12/1996 | Mailloux |
| 5,253,078 A | 10/1993 | Balkanski et al. | 5,594,226 A | 1/1997 | Steger |
| 5,258,998 A | 11/1993 | Koide | 5,594,809 A | 1/1997 | Kopec et al. |
| 5,259,025 A | 11/1993 | Monroe | 5,612,943 A | 3/1997 | Moses et al. |
| 5,261,987 A | 11/1993 | Luening et al. | 5,613,004 A | 3/1997 | Cooperman et al. |
| 5,262,860 A | 11/1993 | Fitzpatrick | 5,618,621 A | 4/1997 | Hasegawa et al. |
| 5,267,334 A | 11/1993 | Normille et al. | 5,629,093 A | 5/1997 | Bischof et al. |
| 5,267,755 A | 12/1993 | Yamauchi et al. | 5,629,980 A | 5/1997 | Stefik |
| 5,276,478 A | 1/1994 | Morton | 5,634,012 A | 5/1997 | Stefik |
| 5,280,537 A | 1/1994 | Sugiyama et al. | 5,635,012 A | 6/1997 | Belluci et al. |
| 5,284,364 A | 2/1994 | Jain | 5,636,276 A | 6/1997 | Brugger |
| 5,288,976 A | 2/1994 | Citron | 5,638,443 A | 6/1997 | Stefik |
| 5,293,399 A | 3/1994 | Hefti | 5,640,193 A | 6/1997 | Wellner |
| 5,295,203 A | 3/1994 | Krause et al. | 5,640,647 A | 6/1997 | Hube |
| 5,298,922 A | 3/1994 | Merkle et al. | 5,646,997 A | 7/1997 | Barton |
| 5,299,019 A | 3/1994 | Pack et al. | 5,646,999 A | 7/1997 | Saito |
| 5,301,981 A | 4/1994 | Nesis | 5,652,626 A | 7/1997 | Kawakami et al. |
| 5,304,513 A | 4/1994 | Haghiri-Tehrani et al. .. 156/245 | 5,652,714 A | 7/1997 | Peterson |
| 5,304,789 A | 4/1994 | Lob et al. | 5,657,462 A | 8/1997 | Brouwer |
| 5,305,400 A | 4/1994 | Butera | 5,658,411 A | 8/1997 | Faykish |
| 5,310,222 A | 5/1994 | Chatwin et al. | 5,659,164 A | 8/1997 | Schmid |
| 5,315,098 A | 5/1994 | Tow | 5,659,726 A | 8/1997 | Sandford, II et al. |
| 5,319,453 A | 6/1994 | Copriviza et al. | 5,660,925 A | 8/1997 | Cooley et al. |
| 5,319,475 A * | 6/1994 | Kay et al. ...................... 359/2 | 5,663,766 A | 9/1997 | Sizer, II |
| 5,319,724 A | 6/1994 | Blonstein et al. | 5,665,951 A | 9/1997 | Newman et al. |
| 5,319,735 A | 6/1994 | Preuss et al. | 5,668,636 A | 9/1997 | Beach et al. |
| 5,321,751 A | 6/1994 | Ray et al. | 5,671,282 A | 9/1997 | Wolff et al. |
| 5,325,167 A | 6/1994 | Melen | 5,673,316 A | 9/1997 | Auerbach et al. |
| 5,334,573 A | 8/1994 | Schild | 5,680,223 A | 10/1997 | Cooper et al. |
| 5,336,657 A | 8/1994 | Egashira et al. | 5,681,356 A | 10/1997 | Barak et al. ................ 29/25.01 |
| 5,337,361 A | 8/1994 | Wang et al. | 5,683,774 A | 11/1997 | Faykish et al. |
| 5,351,302 A | 9/1994 | Leighton et al. | 5,684,885 A | 11/1997 | Cass et al. |
| 5,379,345 A | 1/1995 | Greenberg | 5,687,236 A | 11/1997 | Moskowitz et al. |
| 5,380,695 A | 1/1995 | Chiang et al. | 5,688,738 A | 11/1997 | Lu |
| 5,384,846 A | 1/1995 | Berson et al. | 5,689,620 A | 11/1997 | Kopec et al. |
| 5,385,371 A | 1/1995 | Izawa | 5,694,471 A | 12/1997 | Chen et al. |
| 5,387,013 A | 2/1995 | Yamauchi et al. | 5,697,006 A | 12/1997 | Taguchi et al. |
| 5,393,099 A | 2/1995 | D'Amato | 5,706,364 A | 1/1998 | Kopec et al. |
| 5,394,274 A | 2/1995 | Kahn | 5,712,731 A | 1/1998 | Drinkwater et al. |
| 5,404,377 A | 4/1995 | Moses | 5,715,403 A | 2/1998 | Stefik |
| 5,408,542 A | 4/1995 | Callahan | 5,721,781 A | 2/1998 | Deo et al. ..................... 380/25 |
| 5,422,963 A | 6/1995 | Chen et al. | 5,721,788 A | 2/1998 | Powell et al. |
| 5,422,995 A | 6/1995 | Aoki et al. | 5,734,119 A | 3/1998 | France |
| 5,428,607 A | 6/1995 | Hiller et al. | 5,734,752 A | 3/1998 | Knox |
| 5,428,731 A | 6/1995 | Powers | 5,742,845 A | 4/1998 | Wagner |
| 5,432,870 A | 7/1995 | Schwartz | 5,761,686 A | 6/1998 | Bloomberg |
| 5,435,599 A | 7/1995 | Bernecker | 5,765,152 A | 6/1998 | Erickson |
| 5,446,273 A | 8/1995 | Leslie | 5,768,426 A | 6/1998 | Rhoads |
| 5,448,053 A | 9/1995 | Rhoads | 5,774,452 A | 6/1998 | Wolosewicz |
| 5,449,200 A | 9/1995 | Andric et al. | 5,778,102 A | 7/1998 | Sandford, II et al. |
| 5,450,490 A | 9/1995 | Jensen et al. | 5,783,024 A | 7/1998 | Forkert ....................... 156/351 |
| 5,458,713 A | 10/1995 | Ojster | 5,790,703 A | 8/1998 | Wang |
| 5,460,748 A * | 10/1995 | Mazaki et al. ......... 252/299.01 | 5,801,687 A | 9/1998 | Peterson |
| 5,463,209 A | 10/1995 | Figh | 5,804,803 A | 9/1998 | Cragun et al. |
| 5,463,212 A | 10/1995 | Oshima et al. | 5,809,139 A | 9/1998 | Girod et al. |
| 5,469,506 A | 11/1995 | Berson et al. | 5,809,317 A | 9/1998 | Kogan |
| 5,471,533 A | 11/1995 | Wang et al. | 5,818,441 A | 10/1998 | Throckmorton |
| 5,473,631 A | 12/1995 | Moses | 5,824,447 A | 10/1998 | Tavernier et al. |
| 5,479,168 A | 12/1995 | Johnson et al. | 5,825,892 A | 10/1998 | Braudaway et al. |
| 5,493,677 A | 2/1996 | Bfalogh | 5,828,325 A | 10/1998 | Wolosewicz et al. |
| 5,495,411 A | 2/1996 | Ananda | 5,841,886 A | 11/1998 | Rhoads |
| 5,495,581 A | 2/1996 | Tsai | 5,841,978 A | 11/1998 | Rhoads |
| 5,496,071 A | 3/1996 | Walsh | 5,845,281 A | 12/1998 | Benson |
| 5,499,294 A | 3/1996 | Friedman | 5,846,900 A | 12/1998 | Reiter et al. |
| 5,515,081 A | 5/1996 | Vasilik | 5,848,413 A | 12/1998 | Wolff |
| 5,524,933 A | 6/1996 | Kunt et al. | 5,848,424 A | 12/1998 | Scheinkman |
| 5,530,852 A | 6/1996 | Meske, Jr. et al. | 5,852,673 A | 12/1998 | Young |
| 5,548,645 A | 8/1996 | Ananda | 5,856,661 A | 1/1999 | Finkelstein et al. |
| 5,550,346 A | 8/1996 | Andriash et al. | 5,857,038 A | 1/1999 | Owada et al. |
| 5,553,143 A | 9/1996 | Ross | 5,862,260 A | 1/1999 | Rhoads |
| 5,560,799 A | 10/1996 | Jacobsen | 5,864,622 A | 1/1999 | Marcus |
| 5,573,584 A | 11/1996 | Ostertag et al. | 5,869,819 A | 2/1999 | Knowles |
| 5,579,479 A | 11/1996 | Plum | 5,871,615 A | 2/1999 | Harris |

| | | | |
|---|---|---|---|
| 5,872,589 A | 2/1999 | Morales | |
| 5,875,249 A | 2/1999 | Mintzer et al. | |
| 5,888,624 A | 3/1999 | Haghiri et al. ............. 428/195 | |
| 5,892,900 A | 4/1999 | Ginter et al. | |
| 5,893,910 A | 4/1999 | Martineau | |
| 5,900,608 A | 5/1999 | Iida | |
| 5,902,353 A | 5/1999 | Reber et al. | |
| 5,903,729 A | 5/1999 | Reber et al. | |
| 5,905,248 A | 5/1999 | Russell et al. | |
| 5,905,251 A | 5/1999 | Knowles | |
| 5,912,767 A | 6/1999 | Lee | |
| 5,913,210 A | 6/1999 | Call | |
| 5,915,027 A | 6/1999 | Cox et al. | |
| 5,918,213 A | 6/1999 | Bernard et al. | |
| 5,918,214 A | 6/1999 | Perkowski | |
| 5,920,861 A | 7/1999 | Hall | |
| 5,920,878 A | 7/1999 | DeMont | |
| 5,926,822 A | 7/1999 | Garman | |
| 5,928,788 A | 7/1999 | Riedl | |
| 5,930,377 A | 7/1999 | Powell et al. | |
| 5,930,767 A | 7/1999 | Reber et al. | |
| 5,932,863 A | 8/1999 | Rathus et al. | |
| 5,933,829 A | 8/1999 | Durst et al. | |
| 5,938,726 A | 8/1999 | Reber et al. | |
| 5,938,727 A | 8/1999 | Ikeda | |
| 5,939,695 A | 8/1999 | Nelson | |
| 5,939,699 A | 8/1999 | Perttunen et al. | |
| 5,940,595 A | 8/1999 | Reber et al. | |
| 5,949,055 A | 9/1999 | Fleet et al. | |
| 5,950,173 A | 9/1999 | Perkowski | |
| 5,955,961 A | 9/1999 | Wallerstein ............ 340/825.33 | |
| 5,963,916 A | 10/1999 | Kaplan | |
| 5,969,324 A | 10/1999 | Rebert et al. | |
| 5,971,277 A | 10/1999 | Cragun et al. | |
| 5,974,141 A | 10/1999 | Saito | |
| 5,974,548 A | 10/1999 | Adams | |
| 5,978,773 A | 11/1999 | Hudetz et al. | |
| 5,979,757 A | 11/1999 | Tracy et al. | |
| 5,983,218 A | 11/1999 | Suyeda-Mahmoo | |
| 5,991,876 A | 11/1999 | Johnson | |
| 6,000,607 A | 12/1999 | Ohki et al. ................... 253/379 | |
| 6,003,581 A | 12/1999 | Aihara ....................... 156/555 | |
| 6,007,660 A | 12/1999 | Forkert ...................... 156/256 | |
| 6,012,641 A | 1/2000 | Watada ....................... 235/488 | |
| 6,016,225 A | 1/2000 | Anderson | |
| 6,024,287 A | 2/2000 | Takai et al. | |
| 6,047,888 A | 4/2000 | Dethloff ..................... 235/380 | |
| 6,049,055 A | 4/2000 | Fannash et al. | |
| 6,052,486 A | 4/2000 | Knowlton et al. | |
| 6,062,604 A | 5/2000 | Taylor et al. | |
| 6,064,764 A | 5/2000 | Bhaskaran et al. | |
| 6,066,594 A | 5/2000 | Gunn et al. .................. 503/227 | |
| 6,073,854 A | 6/2000 | Bravenec et al. | |
| 6,082,778 A | 7/2000 | Solmsdorf | |
| 6,089,614 A | 7/2000 | Howland et al. | |
| 6,095,566 A | 8/2000 | Yamamoto et al. | |
| 6,101,602 A | 8/2000 | Fridrich | |
| 6,110,864 A | 8/2000 | Lu | |
| 6,122,403 A | 9/2000 | Rhoads ....................... 382/233 | |
| 6,131,161 A | 10/2000 | Linnartz | |
| 6,146,032 A | 11/2000 | Dunham | |
| 6,146,741 A | 11/2000 | Ogawa et al. | |
| 6,157,330 A | 12/2000 | Bruekers et al. | |
| 6,159,327 A | 12/2000 | Forkert ....................... 156/254 | |
| 6,163,842 A | 12/2000 | Barton | |
| 6,183,018 B1 | 2/2001 | Braum et al. | |
| 6,185,042 B1 | 2/2001 | Lomb et al. | |
| 6,199,144 B1 | 3/2001 | Arora et al. .................. 711/145 | |
| 6,202,932 B1 | 3/2001 | Rapeli ....................... 235/491 | |
| 6,205,249 B1 | 3/2001 | Moskowitz | |
| 6,210,777 B1 | 4/2001 | Vermeulen et al. | |
| 6,234,537 B1 | 5/2001 | Gutmann et al. | |
| 6,243,480 B1 | 6/2001 | Zhao et al. | |
| 6,244,514 B1 | 6/2001 | Otto ........................... 235/492 |
| 6,245,167 B1 | 6/2001 | Stein |
| 6,247,644 B1 | 6/2001 | Horne et al. ................. 235/380 |
| 6,250,554 B1 | 6/2001 | Leo et al. ..................... 235/487 |
| 6,256,736 B1 | 7/2001 | Coppersmith et al. |
| 6,257,486 B1 | 7/2001 | Teicher et al. ............... 235/380 |
| 6,277,232 B1 | 8/2001 | Wang et al. |
| 6,283,188 B1 | 9/2001 | Maynard et al. ............ 156/521 |
| 6,284,337 B1 | 9/2001 | Lorimor et al. |
| 6,286,036 B1 | 9/2001 | Rhoads |
| 6,286,761 B1 | 9/2001 | Wen |
| 6,289,108 B1 | 9/2001 | Rhoads |
| 6,292,092 B1 | 9/2001 | Chow et al. |
| 6,301,363 B1 | 10/2001 | Mowry, Jr. |
| 6,302,444 B1 | 10/2001 | Cobben |
| 6,311,214 B1 | 10/2001 | Rhoads |
| 6,321,981 B1 | 11/2001 | Ray et al. |
| 6,324,573 B1 | 11/2001 | Rhoads |
| 6,343,138 B1 | 1/2002 | Rhoads |
| 6,357,664 B1 | 3/2002 | Zercher ....................... 235/488 |
| 6,372,341 B1 | 4/2002 | Jung et al. |
| 6,389,151 B1 | 5/2002 | Carr et al. |
| 6,390,375 B2 | 5/2002 | Kayanakis .................. 235/492 |
| 6,404,643 B1 | 6/2002 | Chung ........................ 361/737 |
| 6,424,029 B1 | 6/2002 | Giesler ....................... 257/679 |
| 6,418,154 B1 | 7/2002 | Kneip et al. |
| 6,444,377 B1 | 9/2002 | Jotcham et al. |
| 6,473,516 B1 | 10/2002 | Kawaguchi et al. |
| 6,474,695 B1 | 11/2002 | Schneider et al. |
| 6,485,319 B2 | 11/2002 | Bricaud ...................... 439/188 |
| 6,536,665 B1 | 3/2003 | Ray et al. |
| 6,576,309 B2 | 6/2003 | Dalgewicz, III et al. |
| 6,614,914 B1 | 9/2003 | Rhoads et al. ............. 382/100 |
| 6,641,874 B2 | 11/2003 | Kuntz et al. |
| 6,660,368 B2 | 12/2003 | Cooley |
| 6,673,423 B2 | 1/2004 | Kranenburg-Van Dijk et al. |
| 6,723,479 B2 | 4/2004 | Van De Witte et al. |
| 6,753,379 B1* | 6/2004 | Kawate et al. .............. 525/176 |
| 6,773,735 B1 | 8/2004 | Dalgewicz, III |
| 6,803,088 B2* | 10/2004 | Kaminsky et al. ........... 428/141 |
| 6,803,114 B1 | 10/2004 | Vere et al. |
| 6,817,530 B2 | 11/2004 | Labrec et al. |
| 6,817,630 B1 | 11/2004 | Fischer et al. |
| 6,827,277 B2 | 12/2004 | Bloomberg et al. |
| 6,899,824 B2* | 5/2005 | Meyer et al. ............ 252/299.64 |
| 6,986,826 B2* | 1/2006 | Dronzek, Jr. ................. 156/297 |
| 7,052,762 B2* | 5/2006 | Hebrink et al. .............. 428/212 |
| 7,063,264 B2 | 6/2006 | Bi et al. |
| 7,081,282 B2 | 7/2006 | Kuntz et al. |
| 7,143,950 B2 | 12/2006 | Jones et al. |
| 2002/0021001 A1 | 2/2002 | Stratford et al. |
| 2002/0023218 A1 | 2/2002 | Lawandy et al. |
| 2002/0027359 A1 | 3/2002 | Cobben et al. |
| 2002/0068792 A1* | 6/2002 | Kobylanska et al. ........ 524/839 |
| 2002/0145652 A1 | 10/2002 | Lawrence et al. |
| 2002/0146549 A1 | 10/2002 | Kranenburg-Van Dijk et al. |
| 2002/0182352 A1 | 12/2002 | Mitten et al. |
| 2002/0187215 A1 | 12/2002 | Trapani et al. |
| 2003/0038174 A1 | 2/2003 | Jones |
| 2003/0062421 A1 | 3/2003 | Bloomberg et al. ......... 235/904 |
| 2003/0113533 A1* | 6/2003 | Husemann et al. .......... 428/343 |
| 2003/0173406 A1 | 9/2003 | Bi et al. |
| 2003/0178495 A1 | 9/2003 | Jones et al. |
| 2003/0183695 A1 | 10/2003 | Labrec et al. |
| 2003/0226897 A1 | 12/2003 | Jones et al. |
| 2005/0000642 A1* | 1/2005 | Everaerts et al. .......... 156/273.1 |
| 2005/0003222 A1* | 1/2005 | Everaerts et al. ............ 428/522 |
| 2005/0084693 A1 | 4/2005 | LaBrec |
| 2005/0230481 A1* | 10/2005 | Weisz et al. ................. 235/488 |
| 2005/0247794 A1 | 11/2005 | Jones et al. |
| 2005/0274455 A1* | 12/2005 | Extrand .................... 156/272.4 |
| 2006/0009021 A1* | 1/2006 | Herman et al. .............. 438/607 |
| 2006/0138243 A1 | 6/2006 | Bi et al. |

| | | | |
|---|---|---|---|
| 2006/0222830 | A1 | 10/2006 | Bi et al. |
| 2006/0228530 | A1 | 10/2006 | Bi et al. |
| 2007/0158939 | A1 | 7/2007 | Jones et al. |

FOREIGN PATENT DOCUMENTS

| | | |
|---|---|---|
| DE | 3806411 | 9/1989 |
| EP | 058 482 | 8/1982 |
| EP | 372 601 | 6/1990 |
| EP | 411 232 | 2/1991 |
| EP | 441 702 | 8/1991 |
| EP | 479 295 | 4/1992 |
| EP | 493 091 | 7/1992 |
| EP | 581 317 | 2/1994 |
| EP | 629 972 | 12/1994 |
| EP | 650 146 | 4/1995 |
| EP | 705 025 | 4/1996 |
| EP | 642 060 | 4/1999 |
| GB | 1472581 | 5/1977 |
| GB | 2063018 | 5/1981 |
| GB | 2067871 | 7/1981 |
| GB | 2196167 | 4/1988 |
| GB | 2204984 | 11/1988 |
| GB | 2325765 | 12/1998 |
| JP | 63-146909 | 6/1988 |
| JP | 3-185585 | 8/1991 |
| JP | 4-248771 | 9/1992 |
| JP | 5-242217 | 9/1993 |
| JP | 7115474 | 5/1995 |
| JP | 10171758 | 6/1998 |
| JP | 10177613 | 6/1998 |
| WO | 1982/04149 | 11/1982 |
| WO | 1989/08915 | 9/1989 |
| WO | 1994/27228 | 11/1994 |
| WO | 1995/10835 | 4/1995 |
| WO | 1995/14289 | 5/1995 |
| WO | 1995/20291 | 7/1995 |
| WO | 1996/27259 | 9/1996 |
| WO | 1996/36163 | 11/1996 |
| WO | 1997/43736 | 11/1997 |
| WO | 1998/14887 | 4/1998 |
| WO | 1998-20642 | 5/1998 |
| WO | 1998/24050 | 7/1998 |
| WO | 1998/40823 | 9/1998 |
| WO | 1998/49813 | 11/1998 |
| WO | 1999/34277 | 7/1999 |
| WO | 2000/43216 | 7/2000 |
| WO | 2001/43080 | 6/2001 |
| WO | 2003/05291 | 1/2003 |

OTHER PUBLICATIONS

"Access Control and Copyright Protection for Images, WorkPackage 1: Access Control and Copyright Protection for Images Need Evaluation," Jun. 1995, 21 pages.
"Access Control and Copyright Protection for Images WorkPackage 8: Watermarking " Jun. 30 1995, 46 pages.
"Copyright Protection for Digital Images, Digital Fingerprinting from FBI, "Highwater FBI brochure 1995, 4 pages.
"Cyphertech Systems: Introduces Digital Encoding Device to Prevent TV Piracy," Hollywood Reporter, Oct. 20, 1993, p. 23.
"Foiling Card Forges With Magnetic Noise," Wall Street Journal, Feb. 8, 1994.
"High Water FBI Limited Presentation Image Copyright Protection Software," FBI Ltd. brochure, Jul. 1995, 17 pages.
"NAB—Cyphertech Starts Anti-Piracy Broadcast Tests," Newsbytes, NEW03230023, Mar. 23, 1994.
"The Copyright Can of Worms Opened Up By The New Electronic Media," Computergram Internations, pCGN07170006, Jul. 17, 1995 and The Copyright Can of Worms Opened Up By the New Electronic Media-2, Computergram Internations, pCGN07210008, Jul. 21, 1995, 3 pages.
Arachelian, "White Noise Storm," Apr. 11, 1994, Internet reference, 13 pages.

Arthur, "Digital Fingerprints Protect Artwork," New Scientist, Nov. 12, 1994, p. 24.
Bender et al., "Techniques for Data Hiding, "Massachusetts Institute of Technology, Media Laboratory, Jan. 1995, 10 pages.
Boland et al, "Watermarking Digital Images for Copyright Protection, "Fifth International Conference on Image Processing and its Applications, Conference Date 4-6 Jul. 1995, Conf. Publ. No. 410, pp. 326-330.
Boneh, "Collusion-Secure Fingerprinting for Digital Data," Department of Computer Science, Princeton University, 1995, 31 pages.
Bovik, "Handbook of Image and Video Processing," Academic Press, 2000, pp. 133-136, 154, 155.
Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.
Brown, "S-Tools for Windows, Version 1.00, COPYRGT. 1994 Andy Brown, What is Steganography," Internet reference, Mar. 6, 1994, 6 pages.
Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.
Caronni, "Assuring Ownership Rights for Digital Images," Published in the Proceedings of 'Reliable It Systems,' vis '95 Hh. Bruggemann and W. Gerhardt-Hackl (Ed.), Vieweg Publishing Company, Germany, 1995, Jun. 14, 1994, 10 pages.
Choudhury , et al., "Copyright Protection for Electronic Publishing over Computer Networks," IEEE Network Magazine, Jun. 1994, 18 pages.
Clarke, "Invisible Code Tags Electronic Images," Electronic Engineering Times, Jun. 12, 1995, No. 852, p. 42.
Collins, et al., "Using Bar Code—Why It's Taking Over", Second Edition, Data Capture Institute, 1990 (Contents & Index).
Dautzenberg, "Watermarking Images," Department of Microelectronics and Electrical Engineering, Trinity College Dublin, 47 pages, Oct. 1994.
Fitzgerald, "Invisible Digital Copyright ID," Editor & Publisher, Jun. 25, 1994, p. 62.
Friedman, "The Trustworthy Digital Camera: Restoring Credibility to the Photographic Image," IEEE Transaction on Consumer Electronics, vol. 39, No. 4, Nov., 1993, pp. 905-910.
Grieco, Jr. et al.," Behind Bars—Bar Coding Principles and Applications", PT Publication, Inc., 1989 (Table of Contents & Index).
Hecht, "Embedded Data Glyph Technology for Hardcopy Digital Documents," SPIE vol. 2171, Feb. 1994, pp. 341-352.
JPEG Group's JPEG Software (release 4), Ftp.Csua.Berekeley.Edu/Pub/Cypherpunks/Applications/Jsteg/Jpeg.Announcement.Gz, Jun. 7, 1993, 2 pages.
Kassam, Signal Detection in Non-Gaussian Noise, Dowden & Culver, 1988, pp. 1-96.
Kawagucki, et al., "Principle and Applications of BCPS-Streganography," Proc. SPIE vol. 3258: Multimedia Systems and Applications, 2-4 Nov. 1998, pp. 464-473.
Koch, et al., "Copyright Protection for Multimedia Data," Fraunhofer Institute for Computer Graphics, Dec. 16, 1994, 15 pages.
Koch, et al., "Towards Robust and Hidden Image Copyright Labeling," Proc. of 1995 IEEE Workshop on Nonlinear Signal and Image Processing, Jun. 20-22, 1995 4 pages.
Komatsu et al., "Authentication System Using Concealed Image in Telematics," Memoirs of the School of Science & Engineering, Waseda Univ., No. 52, 1988, pp. 45-60.
Komatsu, et al., "A Proposal on Digital Watermarking in Document Image Communication and Its Application to Realizing a Signature," Electronics and Communications in Japan, Part I, vol., 73, No. 5, 1990, pp. 22-23.
Kurak et al., "A Cautionary Note On Image Downgrading," 1992 IEEE, pp. 153-159.
Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Video-Steganography: How to Secretly Embed a Signature in a Picture," IMA Intellectual Property Project Proceedings, Jan. 1995, vol, 1, Issue 1, pp. 187-205.

Matthews, "When Seeing is Not Believing," New Scientist, Oct. 16, 1993, pp. 13-15.

Mintzer et al., "Safeguarding Digital library Contents and Users" Digital watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18 (1994) 318-326.

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

PCT- Notification of the Transmittal of TheInternational Search Report or the Decleration, for the International Application No. PCT/US02/40843, mailed on May 15, 2003.

PCT-International Search Report for International Application No. PCT/US02/40843, mailed on May 15, 2003.

PCT- Notification of the Transmittal of the International Search Report or the Decleration, for the International Application No. PCT/US02/31786, mailed on May 2, 2003.

PCT-International Search Report for International Application No. PCT/US02/31786, mailed on May 2, 2003.

Palmer, " The Bar Code Book", Third Edition, Helmers Publishing, Inc., 1995 (Contents & Index).

Pennebaker et al., JPEG Still Image Data Compression Standard, Chapter 3, "Aspects of the Human Visual System," pp. 23-27, 1993 Van Nostrand Reinhold, New York.

Pitas et al., "Applying Signatures on Digital Images," IEEE Workshop on Nonlinear and Signal Processing, Neos Marmaras, Greece, pp. 460-463, Jun., 1995.

Port, "halting Highway Robbery on the Internet," Business Week, Oct. 17, 1994, p. 212.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Sandford II, et al., "The Data Embedding Method," SPIE vol. 2615, Oct. 23, 1995, pp. 226-259.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforeable Signatures for Electronic Documents, Making Them Valid Legal Instruments" Byte, No. 1993, pp. 309-312.

Schreiber et al., "A Compatible High-Definition Television System Using the Noise-Margin Method of Hiding Enhancement Information, "SMPTE Journal, Dec. 1989, pp. 873-879.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun., 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979.

Szepanski, "Additive Binary Data Transmission for Video Signals," Papers Presented at Conf. Of Comm. Engineering Soc. Sept. 30-Oct. 3, 1980, Technical Reports vol. 74, 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec. 1993, pp. 666-673.

Toga et al., "Registration Revisited," Journal of Neuroscience Methods, 48 (1993), pp. 1-13.

van Schyndel et al., "A Digital Watermark," IEEE International Conference on Image Processing, Nov. 13-16, 1994, pp. 86-90.

Wagner, "Fingerprinting," 1983 IEEE, pp. 18-22.

Walton, "Image Authentication for a Slippery New Age," Dr. Dobb's Journal, Apr. 1995, pp. 18-26, 82-87.

Weber et al., "Correlative Image Registration," Seminars in Nuclear Medicine, vol. XXIV, No. 4, Oct. 1994, pp. 311-323.

Wise, "The History of Copyright, Photographers' Rights Span Three Centuries," Photo>Electronic Imaging, vol. 37, No. 6, 1994.

"Lenticular Prints," 6 pinted pages, printed on Dec. 16, 2002 and accessed from http://www.shortcourses.com/how/lenticular/lenticular.htm.

Bonny Lhotka, et al. "Lenticular Inkjet Printmaking", 2 printed pages, printed on Dec. 16, 2002, and accessed from http://www.dypratt.com/evesmind/lentOverhtm.

Boucqueau, J.-M, Equitable Conditional Access and copyright Protection for Image Based on Trusted Third Parties, Teleservices and Multimedia Communications, vol. 1052, pp. 229-243 (1996).

Castro, et al., "Registration of Translated and Rotated Images Using Finite Fourier Transforms," IEEE Transactions on Pattern Analysis and Machine Intelligence, vol. Pami-9, No. 5, Sep. 1987, pp. 700-703.

Computergram Internations, "The Copyright Can of Worms Opened Up By The New Electronic Media," http://www.cbronline.com/news/the_copyright_can_of_worms_opened_up?pint=1 , Jul. 17, 1995 2 pages.

Computergram Internations, The Copyright Can of Worms Opened Up By the New Electronic Media—2, pCGN07210008, Jul. 21, 1995, 2 pages.

Eastman, Product Data Sheet, Easter Copolyester 5011, Dec. 7, 2004, 2 pages.

Eastman, Product Data Sheet, Easter Copolyester 6763, Apr. 26, 2005 4 pages.

Eastman, Product Data Sheet, Easter Copolyester A150, Jun. 27, 2001, 3 pages.

Humphrey, "Stamping Out Crime," Hollywood Reporter, Jan. 26, 1994, p. S48.

Jain, "Image Coding Via a Nearest Neighbors Image Model," IEEE Transactions on Communications, vol. Com-23, No. 3, Mar. 1975, pp. 318-331.

Moran, "3-D Imagery", 3 printed pages, printed on Dec. 16, 2002 and accessed from http://mvw.flexgraphy.org/flexo/article.cfm?ID=45.

Printed copy of Orasee company web page entitled "Welcome to Orasee Corporation", 2 printed pages, printed on Dec. 13, 2002 and accessed from: http://www.orasee.com/one/main.php3.

Quisquater, et al. "Conditional Access and Copyright Protection based on the use of Trusted Third Parties" 43 pages (1995).

Roberts, "Picture Coding Using Pseudorandom Noise," IRE Trans. on Information Theory, vol. 8, No. 2, Feb., 1962, pp. 145-154.

* cited by examiner (B)

(B)

TAMPER EVIDENT ADHESIVE AND IDENTIFICATION DOCUMENT INCLUDING SAME

RELATED APPLICATION DATA

This application claims benefit of U.S. patent application Ser. No. 60/552,172, filed Mar. 11, 2004, which is hereby incorporated by reference.

This application is related to the following United States Provisional Application: Tamper Evident Security Feature and Identification Document Including Same (Application Number 60/514,178, filed Oct. 23, 2003, Inventors Daoshen Bi, Robert Jones, and Tom Regan and Application No. 10/973,924, filed Oct. 25, 2004);

The present application also is related to the following U.S. Patents and patent applications, each of which is hereby incorporated by reference:

Document Laminate Formed From Different Polyester Materials(Application No. 10/692,463, filed Oct. 22, 2003, Inventor Brian Labrec, (U.S. Patent Publication No. 2005-0084693));

Optically Variable Security Features Having Covert Forensic Features (Application No 10/673,048, filed Sep. 26, 2003, Inventors Robert Jones and Daoshen Bi (U.S. Patent Publication No. 2005-0067497));

Identification Document (Application No. 60/471,429, filed May 16, 2003, inventors Robert Jones, Brian Labrec, Daoshen Bi, and Thomas Regan).

Use of Pearlescent and Other Pigments to Create Security Documents (Application No. 09/969,200, Inventors Bentley Bloomberg and Robert L. Jones, filed Oct. 2, 2001 (now U.S. Pat. No. 6,827,277)).

Identification Card Printed With Jet Inks and Systems and Methods of Making Same (Application No. 10/289,962, Inventors Robert Jones, Dennis Mailloux, and Daoshen Bi, filed Nov. 6, 2002 U.S. Patent Publication No. 2003-0211296)).

Contact Smart Cards Having a Document Core, Contactless Smart Cards Including Multi-Layered Structure, PET-Based Identification Document, and Methods of Making Same (Application No. 10/329,318, filed Dec. 23, 2002—Inventors Robert Jones, Joseph Anderson, Daoshen Bi, Thomas Regan, and Dennis Mailloux (now U.S. Pat. No. 6,843,422)).

Multiple Image Security Features for Identification Documents and Methods of Making Same (Application No. 10/325,434, filed Dec. 18, 2002 —Inventors Brian Labrec, Joseph Anderson, Robert Jones, and Danielle Batey (now U.S. Pat. No. 6,817,530)).

Each of the above U.S. Patent documents is herein incorporated by reference in its entirety. The present invention is also related to U.S. patent application Ser. No. 09/747,735, filed Dec. 22, 2000 (now Publication No. 2003-0038174), Ser. No. 09/602,313, filed Jun. 23, 2000 (now U.S. Pat. No. 6,752,432), and Ser. No. 10/094,593, filed Mar. 6, 2002 (now Publication No. 2002-0170966), U.S. Provisional Patent Application No. 60/358,321, filed Feb. 19, 2002, as well as U.S. Pat. No. 6,066,594. Each of the above U.S. Patent documents is herein incorporated by reference in its entirety

TECHNICAL FIELD

The present invention is generally related to identification documents. In one implementation an identification document has an adhesion controlling layer (formed from an inventive material) applied to couple an overlaminate to the rest of an identification document using an inventive adhesive. The adhesive provides strong adhesion to many different kinds of identification document materials, including plastic card materials such as polyvinyl chloride (PVC), polycarbonate (PC), and amorphous polyester such as amorphous polyethylene terephthalate (APET). More particularly, this inventive adhesive helps to provide unique evidence to protect the security document from heat intrusion and to enable detection of such intrusion.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other so-called personalized or variable data (e.g., data specific to a particular card or document, for example an employee number) and so-called fixed or invariant data (e.g., data common to a large number of cards, for example the name of an employer). All of the cards described above will hereinafter be generically referred to as "ID documents" .

As those skilled in the art know, ID documents such as drivers licenses can contain additional information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a substrate or core layer (which can be pre-printed), such as a light-colored, opaque material (e.g., polycarbonate, TESLIN (available from PPG Industries) polyvinyl chloride (PVC) material, etc). In certain instances and with certain printing or information forming technologies, variable or personalized data can be formed directly on the substrate or core layer. In other instances, the core layer may be coated and/or laminated with another material to enable printing or other methods of forming information. For example, the substrate or core layer can be laminated with a transparent material, such as clear polycarbonate or PVC to form a so-called "card blank".

Certain technologies for forming or printing information may require further protection of the information, so an additional layer of transparent overlaminate can be coupled to the core layer or card blank and the information printed thereon, as is known by those skilled in the art. Illustrative examples of usable materials for overlaminates include polycarbonate, biaxially oriented polyester, or other optically clear durable plastic film.

Information, such as variable personal information (e.g., photographic information), can be formed on the card blank using one or more methods, such as laser xerography, Indigo, intaglio, laser engraving or marking, inket printing, thermal or mass transfer printing, dye diffusion thermal transfer ("D2T2") printing, (described in commonly assigned U. S. Pat. No. 6066594, which is incorporated herein by reference in its entirety.), etc. The information can, for example, comprise an indicium or indicia, such as the invariant or nonvarying information common to a large number of identification documents, for example the name and logo of the organization issuing the documents. The information may be formed by any known process capable of forming the indicium on the specific core material used.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Identification documents of the types mentioned above can take a number of forms, depending on cost and desired features. For example, some ID documents comprise highly plasticized poly(vinyl chloride) or have a composite structure with polyester laminated to 0.5-2.0 mil (13-51 .mu.m) poly (vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways, as appreciated by those skilled in the art, and they may be visible or invisible (covert) in the finished card. If invisible, they can be detected by viewing the feature under conditions which render it visible. At least some of the verification features discussed above have been employed to help prevent and/or discourage counterfeiting.

Counterfeiting and/or Alteration of ID documents

Despite the advances in the manufacture of ID documents, the ID document counterfeiter remains surprisingly resourceful. Improvements are needed to stay ahead of the counterfeiter. One counterfeiting technique involves a de-lamination attack. Consider an ID document that includes a printed substrate covered by a laminate layer. A de-lamination attack removes the laminate layer, sometimes with the aid of heat, to access information printed on the substrate. Once revealed, the counterfeiter can alter the printed information and reuse the substrate or laminate.

Some ID documents are susceptible to this type of attack. Consider the ID document including a substrate, ink applied to the substrate (or laminate layer) to convey information and a laminate layer covering the ink and substrate. Conventional inks generally include a strong adhesion to either a document substrate or to a laminate. A counterfeiter can use this design characteristic (adhesion) to his advantage. Upon de-lamination, the ink may adhere to the substrate layer or to a laminate layer. Regardless, the printed information is typically preserved on at least one layer and may be used again. (For example, if the ink adheres to a laminate, the counterfeiter can reuse the laminate. Or if the ink adheres to the substrate, the counterfeiter can perhaps alter the information by applying additional ink, or simply reuse the remaining information on the substrate.).

U.S. Pat. No. 5,380,695, herein incorporated by reference, discloses an identification document designed to help deter intrusion attempts. With reference to FIG. 1, an image-receiving element 10 includes a support 12, a polymeric security layer 14 including printing, and an image-receiving layer 16. The polymeric security layer 14 is designed such that its cohesivity is less than its adhesivity for each layer that is contiguous thereto (layers 16 and 12b). A printed security pattern 18 is hopefully destroyed (into pieces 18a and 18b) through partitioning of the security layer 14 during an attempted de-lamination of the image-receiving layer 16 from the image-receiving element 12b (see FIG. 2).

Adhesives used with Overlaminate

Another type of delamination attack involves removal of the overlaminate. Over-laminate has been commonly applied as a protective layer for many types of security documents, such as identification cards, driver licenses, passports, and security badges. Over-laminates can be used to protect printed plastic cards (and the information formed on them) from abrasion, chemical attack such as plasticizer from the wallet, coffee, and bleach, from ultraviolet radiation, and from counterfeiting and tampering. Currently, most overlaminates consist of two layers: polyester base film and a thin layer of thermal active adhesive. With appropriate levels of heat and pressure, the overlaminate will bond to plastic card surface.

Although many overlaminates have been developed and produced for protection of ID documents, many existing laminates and/or adhesives used with them may have at one or more of the following limitations:

(a) Some overlaminate products are compatible only with certain types of other laminates and/or card blanks. For example, TBSN (available from Transilwrap Company, Inc., of Franklin Park, Illinois) generally is compatible only with PVC and cannot be used with polyester or polycarbonate.

(b) Some thermally active adhesives have a low glass transition temperature, which may cause film blocking and machine jam problems.

(c) Because the overlaminate is adhered onto the ID document surface by heat and pressure, reapplication of heat may enable intrusion into the ID document (e.g., cause complete or partial delamination of the overlaminate).

At least some embodiments of the invention help to overcome these and other disadvantages.

In one embodiment, we provide a composition for adhering a first article to a second article, the composition comprising a thermally active low Tg polymeric resin; and a multifunctional crystalline polymer. The thermally active low Tg polymeric resin can, for example, comprise 50-99% of the composition. The multifunctional crystalline polymer can, for example, comprise 1-50% of the composition. In one embodiment, the multifunctional crystalline polymer comprises 5-20% by weight of the composition. In one embodiment, the multifunctional crystalline polymer has a low molecular weight.

The thermally active low Tg polymeric resin can, for example, comprise at least one of a high molecular weight low Tg linear amorphous polyester, a polymeric plasticizer, VITEL 3650, polyacrylate, polyethylene vinylacrylate, polyester, and polyurethane.

The multifunctional crystalline polymer can, for example, comprise at least one of a di-functional polyester, a tri-functional polyester, a multi-functional polyester, polypropylene, polyamide, acetal, high density polyethylene, and VITEL 5833.

In one embodiment, the composition forms a plurality of crystals when heated at a temperature above a predetermined temperature and then cooled, wherein the predetermined temperature is a temperature lower than a standard lamination temperature, for example about 220 degrees Fahrenheit. The crystals can have a "snow flake" like appearance.

In another embodiment, we provide an identification document, comprising an information bearing layer, an adhesive layer, and a protective layer. The adhesive layer overlays at least a portion of the information-bearing layer and comprises a thermally active low Tg polymeric resin and a multifunctional crystalline polymer. The protective layer is coupled to the information-bearing layer via the adhesive layer. The adhesive layer, in one embodiment, is constructed and arranged such that subjecting the identification document to a temperature above a predetermined temperature causes a plurality of crystals to form in the adhesive layer. This crystal formation can be substantially irreversible.

The foregoing and other features and advantages of the present invention will become even more apparent with reference to the following detailed description and the accompanying drawings.

BRIEF DESCRIPTION OF THE DRAWINGS

The advantages, features, and aspects of embodiments of the invention will be more fully understood in conjunction with the following detailed description and accompanying drawings, wherein.

Figure 1:
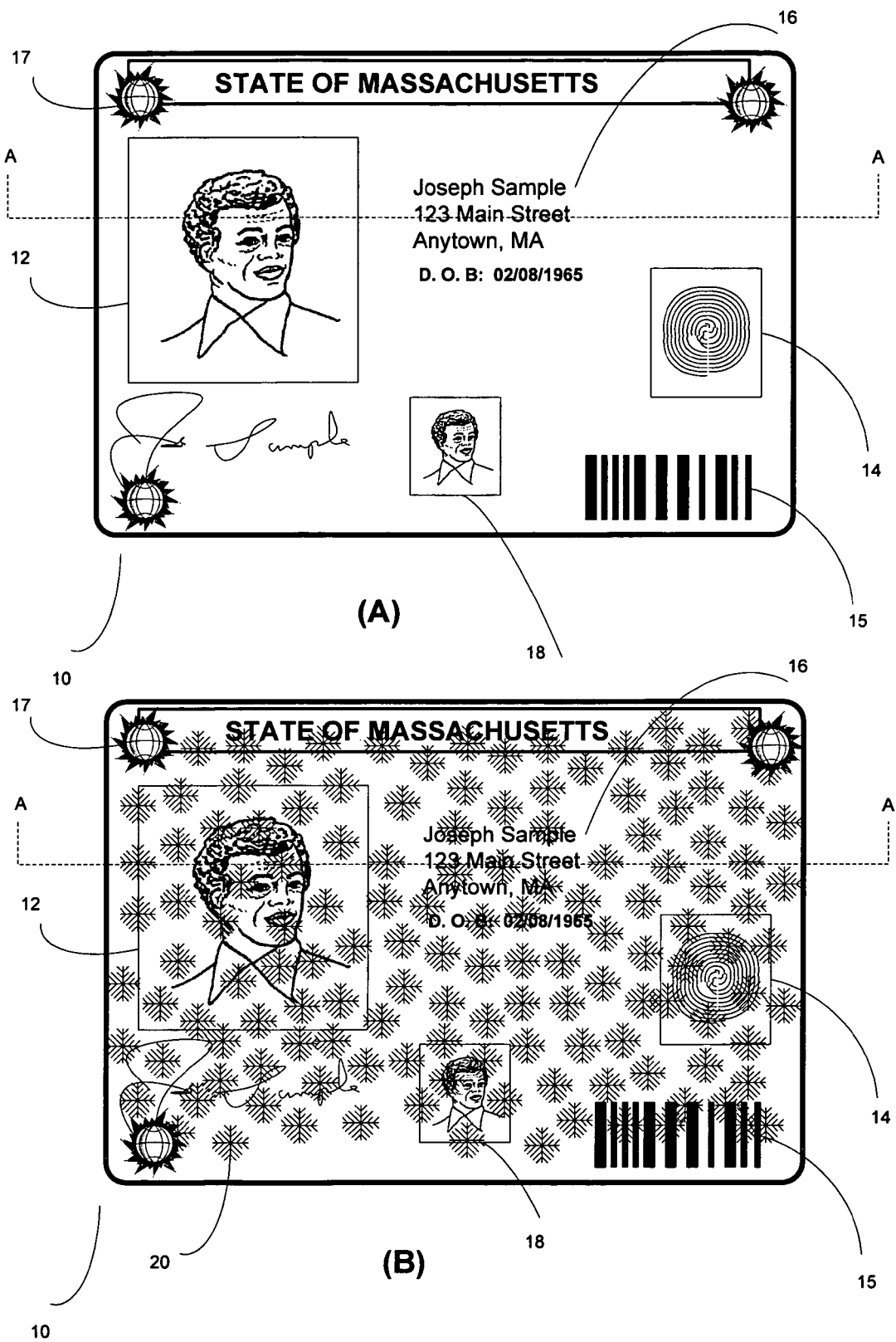
FIG. 1A is a view of an identification document in accordance with the invention, before at least a portion of the identification document is brought to a predetermined temperature.
FIG. 1B is a view of the identification document of FIG. 1A after at least a portion of the identification document is brought to a predetermined temperature and then cooled to a temperature below the predetermined temperature.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. However, transparency is not required. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer. Of course, the types and structures of the laminates described herein are provided only by way of example, those skilled in the art will appreciated that many different types of laminates are usable in accordance with the invention.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures. It should be appreciated, however, that the present invention is not so limited. Indeed, as those skilled in the art will appreciate the invention. For example, in at least some embodiments, the invention is usable with virtually any product/process which is to be laminated or coupled to a laminate in any way.

Description of the Figures

We have developed an inventive material with unique adhesion and thermal response properties that enable it to provide useful manufacturing, anti-tampering, and anti-counterfeiting functionality to ID documents. The inventive material can be used in many different ways, including as an adhesive, as a seal, as a security pattern, as part of a coating, and as part of a laminate In a first embodiment, the inventive material is an adhesive formulation containing 50-99% of a thermally active low glass transition temperature ($T_g$) polymeric resin and 1-50% of a multifunctional crystalline polymer.

The thermally active low $T_g$ polymeric resin can, for example, be made of materials such as polyacrylate, polyethylene vinylacrylate, polyester, and polyurethane. One example of a thermally active low $T_g$ (glass transition temperature) polymeric resin that we have found useful is VITEL 3650, which is a high molecular weight, low $T_g$ linear amorphous polyester. VITEL 3650 acts as a polymeric plasticizer to improve the melt flowability during heat lamination.

The multifunctional crystalline polymers can be di-, tri-, or multi- functional polyesters. In an advantageous embodiment, the inventive material includes 5 to 20% by weight of di, tri, or multifunctional polymer material. Illustrative examples of usable multifunctional polymer materials, in accordance with at least some embodiments of the invention, include materials such as VITEL 5833 (available from Bostick-Findley, Inc., of Middleton, Massachusetts), which is a low molecular weight, highly functional branched polyester with high crystallinity. We have found that the high level of active sites in VITEL 5833 help to provide more interaction to some types of materials, such as polycarbonate, to improve adhesion. In addition, we have found that the low molecular weight of VITEL 5833 provides surface wetting during heat lamination. We have produced a particularly effective embodiment of the inventive material using a concentration of 10% (by weight) of VITEL 5833. Additional usable multifunctional polyesters include polypropylene, polyamide, acetal, high density polyethylene (HDPE), low density polyethylene, etc.

In at least some embodiments, the multifunctional polymer is a multifunctional crystalline polymer. Use of a multifunctional crystalline polymer provides at least two advantages. First, the multifunctional crystalline polymer has a very good anti-blocking property, which helps to improve processes for applying the multifunctional crystalline polymer to an ID document. Another advantage of using the multifunctional crystalline polymer is that some types of this polymer form a pattern of visible, irreversible "snow flake like" crystals when heated above 220 degrees Fahrenheit, which can help provide evidence of tampering. This can be understood further by viewing the FIGs, as discussed below.

At least some embodiments of our inventive material also have advantages that enable certain manufacturing processes (e.g., lamination), to occur at lower temperatures. Laminating at lower temperatures helps to achieve proper bond strength and helps to ensure the flatness of the material (e.g., part of an ID document) being laminated.

We have also found that the adhesion properties of our inventive material can provide advantages when used with ID documents. We have found that the inventive material has strong adhesion to many types of materials used to make ID documents, including but not limited to polyvinyl chloride (PVC), polycarbonate (PC), amorphous polyester, polyethylene terephthalate (PET), amorphous PET (A-PET), polyolefin, TESLIN, etc. . We have also found that our inventive material has excellent adhesion to the certain of our proprietary materials, such as materials described in a commonly assigned patent application entitled "Document Laminate Formed From Different Polyester Materials" (Ser. No. 10/692463, Attorney docket Number P0901D, filed Oct. 22, 2003, Inventor Brian Labrec).

The inventive material also has strong adhesion properties to many different types of inks that are printed on identification cards, including but not limited to inks used with printers such as the XEROX Doc-12, XEROX 3535, Hewlett Packard Indigo, Intaglio, inkjet inks, etc. In at least one embodiment, we have found that, by applying the inventive material substantially adjacent to printed indicia (e.g., under it or over it), and by selecting appropriate core materials, laminate materials, and inks, we are able to apply the inventive material in a manner that causes cohesive failures in the printed indicia when an intrusion to the ID document is attempted. During such an attempted intrusion, the strong adhesion properties of the inventive material cause it to adhere firmly to the printing and to any other materials to which it is applied. This helps to make detection of tampering more apparent.

In one embodiment, by including a material such as a tri-functional polymer material, the inventive material described herein can be used with (and have good adhesion to) a variety of materials used for ID documents, especially materials used to make ID cards (e.g., PVC, PC, PET, etc.), especially as compared with some types of polyester resins (e.g., VITEL 2700B LMW) or with certain materials (e.g., TBSN, available from Transilwrap Company, Inc., of Franklin Park, Illinois).

We have found use of di, tri, and/or multifunctional polymers particularly advantageous with ID document materials (e.g., substrate (or core layer) and laminate (or cover layer) made using polycarbonate, because of the good adhesion that results from the high level of active sites in many of such polymers (e.g., the VITEL 5833) that provide more interaction to polycarbonate. In addition, we have found that the low molecular weight of at least some of these polymers (e.g., VITEL 5833) provides useful surface wetting during heat lamination processes. Still another advantage is that use of the di, tri, and/or multifunctional polymers can enable lamination of ID documents to occur at lower temperatures while still achieving proper bond strength and a substantially flat ID document (e.g., card). For example, in the production of some known types of ID cards, a lamination temperature of 230 to 240 degrees Fahrenheit is required. Using at least some of the di, tri-, and/or multifunctional polymers described herein can enable lamination processes to occur at lower temperatures (e.g., 210 to 220 degrees Fahrenheit).

We have found that the VITEL 5833 can be useful for the purposes of providing an adhesion controlling layer in concentrations from 1% to 50% by weight, and especially from 5-20% by weight.

As those skilled in the art will appreciate, the inventive material used of the adhesion controlling layer can contain other materials, including additives such as ultraviolet (UV) colorants, infrared (IR) colorants, visible colorants (e.g., to make the adhesion controlling layer appear blue, red, etc.), thermachromic colorants, optically varying colorants, pearlescent colorants, etc. For example, we specifically anticipate that the colorants described in commonly assigned U.S. patent application Ser. no. 09/969,200, entitled "Use of Pearlescent and Other Pigments to Create Security Documents" (now U.S. Pat. No. 6,827,277), the contents of which are hereby incorporated by reference, are usable with the inventive materials described herein. Such additives enable the adhesion controlling layer to be visible, for example, only under selected conditions. Such an additive also can enable the security seal to be substantially invisible when applied over certain types of indicia. For example, an adhesion controlling layer containing an infrared colorant could be applied over indicia formed using an ultraviolet ink. The adhesion controlling layer would not, of course, be visible when the indicia is viewed using UV light.

EXAMPLES

Example 1

A first approach involved tests of embodiments of the invention to see whether the inventive materials can improve the adhesion of a polyethylene terephthalate (PET) overlaminate film to the back of an ID document having a polycarbonate (PC) surface. We modified a Vitel 2700B LMW adhesive coating solution by the addition of Vitel 5833 and Vitel 3650. Vitel 5833 is a low molecular weight, highly functional branched polyester with high crystallinity. Its high level of active sites provides more interaction to polycarbonate to improve adhesion. The low molecular weight provides surface wetting during heat lamination. Vitel 3650 is a high molecular weight, low Tg, linear amorphous polyester. It acts as a polymeric plasticizer to improve the melt flowability during heat lamination.

ID documents, in the form of cards, were made by laminating 12-mil polycarbonate/KRTY 3" (Roll 817725-001-1-90070) on both sides of TESLIN sheets. Overlaminate PET films were made by coating 30% solid adhesive solutions with #4 bar on 1.2 mil 301H PET film, and drying at 60° C. for 5 min. Coating solutions were made by 1.5-3.0% Vitel 5833, 28.5-27.0% Vitel 2700B LMW, 56.0% MEK, 14% Toluene; and by 3.0-15.0% Vitel 3650, 27.0-15.0% Vitel 2700B LMW, 56.0% MEK, 14% Toluene. 30% Vitel 2700B LMW solution.

These cards were overlaminated on a Polaroid ColorCard Printer Model 85 SC (Atlantek 85 DSC serial # 000233). The both top and bottom temperature settings on the printer were 58. The temperature between card and overlaminate PET film was measured to be about 235° F. The overlaminate PET film containing more than 20% of Vitel 3650 in adhesive layer was very difficult to laminate by the printer.

Peel Testing

A peel test was done on the cards using an Instron 5543 material test system. All test samples were cut to a width of 0.5 inch. All test data recorded were the average load force between peel extensions 0.5 to 1.0 inch at 10 inches/min peel rate. Table 1 lists the peel test data. The data in Table 1 tends to indicate that addition of Vitel 5833 or Vitel 3650 into Vitel 2700B LMW increases adhesion strength. Too much Vitel 3650 presumably decreases the total number of functional groups leading to a loss of strength.

TABLE 1

Instron Peel Test
(LBS/INCH WIDTH)

| Sample | Smurfit #8017 | Vitel 2700B LMW | Vitel 5833 5%* | Vitel 5833 8%* | Vitel 5833 10%* | Vitel 3650 10%* | Vitel 3650 20%* |
|---|---|---|---|---|---|---|---|
| 1 | 0.58 | 0.98 | 1.16 | 0.66** | 1.00 | 1.70** | 1.17 |
| 2 | 1.02 | 1.32 | 1.42** | 0.64 | 1.40 | 1.84 | 0.64 |
| 3 | 0.58 | 0.48 | 1.42 | 1.64 | 1.28** | 1.38** | 1.82 |
| 4 | 0.54 | 0.54 | 1.60 | 1.30 | 1.56** | 1.16** | 0.86 |
| 5 | 0.54 | 0.90 | 1.00 | 1.50** | 2.12** | 2.02** | 0.46 |
| 6 | 0.66 | 0.68 | 0.98 | 0.68** | 1.98 | 2.36** | 0.98 |
| 7 | 0.92 | 0.56 | 1.74 | 1.32 | 1.88 | 2.10** | 0.84 |
| 8 | 0.72 | 0.64 | 1.38 | 1.50 | 2.28 | 2.06** | 0.30 |
| 9 | 0.76 | 0.56 | 1.28 | 1.62 | 1.84 | 2.06** | 0.38 |
| Ave | 0.70 | 0.74 | 1.33 | 1.21 | 1.70 | 1.85 | 0.82 |

*% in coating with Vitel 2700B LMW
**broke the film

Temperature And Humidity Testing

The test cards were kept at 70° C. and 100% (RH) for 3days. The peel tests were done without equilibration after taking samples out of 70/100. Table 2 shows adhesion of Vitel 2700B LMW became better because of high temperature annealing. Addition of Vitel 3650 resulted in lost adhesion strength because of its plasticizing effect at high temperature. Samples Vitel 5833 showed better adhesion property after 70/100.

TABLE 2

Instron Peel Test after 3 Days at 70/100
(LBS/INCH WIDTH)

| Sample | Vitel 2700B LMW | Vitel 5833 5%* | Vitel 5833 8%* | Vitel 5833 10%* | Vitel 3650 10%* | Vitel 3650 20%* |
|---|---|---|---|---|---|---|
| 1 | 0.64** | 0.46** | 1.04 | 1.56** | 0.48 | 0.84 |
| 2 | 1.88** | 1.80** | 1.24 | 2.30** | 0.36 | 0.46 |
| 3 | 1.20** | 1.00** | 1.62** | 1.58** | 1.50** | 0.90 |
| 4 | 1.82** | 1.30** | 1.08** | 1.60** | 0.70 | 0.72 |
| 5 | 1.42** | 1.26** | 1.20** | 1.34** | 0.52** | 0.48 |
| 6 | 0.66** | 1.06** | 1.86** | 2.22** | 1.08** | 0.48 |
| Ave | 1.27 | 1.15 | 1.34 | 1.77 | 0.77 | 0.65 |

*% in coating with Vitel 2700B LMW
**broke the film

Blocking Test

The tests were done by facing the adhesive side of overlaminate film to uncoated overlaminate film, and adding 0.076 lb/inch$^2$ weight on the top. The samples with a higher content of Vitel 5833 showed better results.

TABLE 3

Blocking Test

| | Vitel 2700B LMW | Vitel 5833 5%* | Vitel 5833 8%* | Vitel 5833 10%* | Vitel 3650 10%* |
|---|---|---|---|---|---|
| 40° C. 3 days | Pass | Pass | Pass | Pass | Fail |
| 50° C. 3 hrs | Fail | Fail | Pass | Pass | Fail |

*% in coating with Vitel 2700B LMW

Based on the testing in this example, the results indicated that addition of Vitel 5833 not only improved the adhesion of overlaminate PET film on polycarbonate but also gave better results in the blocking test. Vitel 5833 has potential as a component in a hot melt adhesive coating.

Example 2

A second approach involved investigating the effect of the thickness of hot melt adhesive layers on the adhesion of overlamination PET film to the back of ID cards (polycarbonate surface). Identification documents in the form of cards were made by laminating 12-mil polycarbonate/KRTY 3" (Roll 817725-001-1-90070) on both sides of Teslin sheets. Overlaminate PET films were made by coating 30% solid adhesive solutions with #4, #7 and #10 bar on 1.2 mil 301H PET film, and drying at 60° C. for 5 min. Coating solutions were made by 3.0% Vitel 5833, 27.0% Vitel 2700B LMW, 56.0% MEK, 14% Toluene.

The cards were overlaminated on a Polaroid ColorCard Printer Model 85SC (Atlantek 85 DSC serial #000233). Both the top and bottom temperature settings on the printer were 58. The temperature between card and overlaminate PET film was measured to be about 235° F.

The coating thickness of the film was measured by RMES at different positions on the film. The data in Table 4 shows that the thickness of hand coated samples was not very uniform. The data also indicate that the condition of the #10 bar was not good.

TABLE 4

| Measurement | Coating Thickness | | | |
|---|---|---|---|---|
| | #4 bar | #4 bar | #7 bar | #10 bar |
| 1 | 0.0002 | 0.0002 | 0.0003 | 0.0001 |
| 2 | 0.0002 | 0.0004 | 0.0002 | 0.0001 |
| 3 | 0.0003 | 0.0003 | 0.0002 | 0.0002 |
| 4 | 0.0002 | 0.0002 | 0.0003 | 0.0002 |
| 5 | 0.0002 | 0.0003 | 0.0002 | 0.0001 |
| 6 | 0.0001 | 0.0003 | 0.0004 | 0.0002 |
| 7 | 0.0002 | 0.0003 | 0.0003 | 0.0001 |
| 8 | 0.0001 | 0.0002 | 0.0004 | 0.0001 |
| 9 | 0.0003 | 0.0002 | 0.0004 | 0.0001 |
| Ave (in) | 0.00020 | 0.00026 | 0.00030 | 0.00013 |
| Ave (μ) | 5.08 | 6.60 | 7.62 | 3.32 |

PEEL TEST All test samples were cut to a width of 0.5 inch. All test data recorded involved the average between peel extensions of 0.5 to 1.0 inch at 10 inches/min peel rate. Table 5's data indicates that the adhesion increases with an increase in the thickness of the adhesive layer.

TABLE 5

| | Instron Peel Test (LBS/INCH WIDTH) | | | |
|---|---|---|---|---|
| Sample | 3.3μ Adhesive | 5.1μ Adhesive | 6.6μ Adhesive | 7.6μ Adhesive |
| 1 | 0.66 | 1.18 | 1.42 | 1.42 |
| 2 | 0.68 | 1.10* | 1.42 | cannot peel |
| 3 | 0.90 | 1.64* | 1.72* | 1.96* |
| 4 | 1.26 | 1.24 | 1.52 | 1.82 |
| 5 | 1.30* | 1.02 | 1.72 | 2.12* |
| 6 | 1.00 | 0.98 | 1.54* | 1.60* |
| 7 | 1.24* | 0.88* | 1.72* | 1.84 |
| 8 | 1.20 | 1.56* | 1.20 | 1.96 |
| 9 | 1.08 | 1.00 | 1.42 | 1.50* |
| Ave | 1.04 | 1.18 | 1.52 | 1.78 |

*broke the film

Based on this approach in this example, we believe that increasing the thickness of the hot melt adhesive layer will improve adhesion. Mechanism coated samples can help confirm the proper thickness of the adhesive layer for this.

Example 3

In this approach, we investigated an embodiment of the inventive material in the form of a hot melt adhesive formulation. We investigated it using the following three types identification documents (in the form of cards):

(a) polyvinyl chloride cards, with polyvinyl chloride on both the front and back surfaces (b) TESLIN-core cards having a polyester (e.g., PET) laminate layer with a D2T2 receiving layer on the front and surface and polyester (e.g., PET) on the back surface. These cards are codenamed "DSC" and are similar to those some embodiments disclosed in commonly owned U.S. Pat. No. 6,066,594, the contents of which are herein incorporated by reference, (c) TESLIN core cards having a PC laminate layer with a D2T2 receiving layer on the front surface and a PC layer on the back surface. These cards are codenamed DM-1 and also are similar to those described in U.S. Pat. No. 6,066,594 and also to those described in commonly assigned U.S. patent application 60/471,429, entitled "Identification Card". The contents of both of these documents are hereby incorporated by reference).

We tested the following overlaminate films on these cards, as well:

(d) TG, for both surfaces of the PVC card and the front surfaces of DSC and DM-1 cards
(e) TV, for the back surface of the DSC card
(f) Smurfit, for the back surface of DM-1 card
(g) 12% Vitel 5833 film for all surfaces of cards Note that 12% Vitel 5833 film was made by coating 30% solid adhesive solutions of 3.6% Vitel, 26.4%Vitel 2700B LMW, 56.0% MEK, 14% Toluene with #4 bar on 1.2 mil 301H PET film, and drying at 60° C. for 5 min.

The above cards were overlaminated on a Polaroid Color-Card Printer Model 85 SC (Atlantek 85 DSC serial # 000233) printer. Both the top and bottom temperature settings on the printer were 58. The temperature between card and overlaminate PET film was measured to be about 235° F.

Peel Test

The peel test was done using an Instron 5543 material test system. All test samples were cut to a width of 0.5 inch. All test data recorded were the average load force between peel extensions 0.5 to 1.0 inch at 10 inches/min peel rate. Tables 6 through 8 shows the results of peel testing on the three types of cards, each having the indicated overlaminate:

TABLE 6

| | Instron Peel Test of PVC Card (LBS/INCH WIDTH) | |
|---|---|---|
| Sample | PVC TG | PVC 12% Vitel 5833 |
| 1 | Cannot peel | Cannot peel |
| 2 | Cannot peel | Cannot peel |
| 3 | 2.26* | Cannot peel |
| 4 | Cannot peel | Cannot peel |
| 5 | Cannot peel | Cannot peel |
| 6 | Cannot peel | Cannot peel |
| 7 | Cannot peel | Cannot peel |
| 8 | Cannot peel | Cannot peel |
| 9 | 2.42* | Cannot peel |

*broke the film

TABLE 7

| | Instron Peel Test of DSC Card (LBS/INCH WIDTH) | | | |
|---|---|---|---|---|
| Samples | DSC Front TG | DSC Front 12% Vitel 5833 | DSC Back TV | DSC Back 12% Vitel 5833 |
| 1 | Cannot peel | Cannot peel | 0.58 | 1.94* |
| 2 | Cannot peel | Cannot peel | 0.88 | Cannot peel |
| 3 | Cannot peel | Cannot peel | 0.46 | 1.84* |
| 4 | Cannot peel | Cannot peel | 0.50 | Cannot peel |
| 5 | Cannot peel | Cannot peel | 0.46 | Cannot peel |
| 6 | Cannot peel | Cannot peel | 0.56 | 2.28* |
| 7 | Cannot peel | Cannot peel | 0.60 | Cannot peel |
| 8 | Cannot peel | Cannot peel | 0.52 | Cannot peel |
| 9 | Cannot peel | Cannot peel | 0.62 | Cannot peel |

*broke the film

TABLE 8

| | Instron Peel Test of DM-1 Card (LBS/INCH WIDTH) | | | |
|---|---|---|---|---|
| Samples | DM-1 Front TG | DM-1 Front 12% Vitel 5833 | DM-1 Back Smurfit | DM-1 Back 12% Vitel 5833 |
| 1 | Cannot peel | Cannot peel | 0.92 | 2.44* |
| 2 | Cannot peel | Cannot peel | 0.84 | 2.24* |
| 3 | 2.56* | Cannot peel | 0.76 | Cannot peel |

TABLE 8-continued

Instron Peel Test of DM-1 Card
(LBS/INCH WIDTH)

| Samples | DM-1 Front TG | DM-1 Front 12% Vitel 5833 | DM-1 Back Smurfit | DM-1 Back 12% Vitel 5833 |
|---|---|---|---|---|
| 4 | 2.52* | Cannot peel | 0.78 | Cannot peel |
| 5 | Cannot peel | Cannot peel | 0.70 | 2.22* |
| 6 | Cannot peel | Cannot peel | 0.82 | 1.84* |
| 7 | 2.64* | Cannot peel | 0.78 | 1.74* |
| 8 | Cannot peel | Cannot peel | 0.74 | 1.98* |
| 9 | 2.40* | Cannot peel | 0.80 | 1.84* |

*broke the film

Based on our testing in this example, we have found that an inventive material that includes, for example, 12% Vitel 5833 film is equal to or better than the current overlaminate films used on many identification documents. We believe that our inventive material, using a range of 5-20% Vitel 5833 (or equivalent materials) has the potential to replace all other adhesive layers for overlamination of ID documents such as ID cards.

Example 4

Crystallization

FIG. 1A is an illustrative example of an identification document 10, before an attempted tampering by heat intrusion. Details of the construction of such an identification document and of forming information on or in it are presumed to be within the skill of those in the art and are not provided here. The identification document 10 includes, by way of example only, a bearer image 12, biometric data 14, a bar code 15, demographic data 16, and a ghost image 18. The ID document 10 includes an overlaminate 62 (shown in greater detail in FIGS. 2 and 3A), and, in this example, the overlaminate includes a pre-printed security pattern 17. The pre-printed security pattern 17 can, in practice, cover the entire surface of the ID document 10, but for purposes of illustration the details of the pattern are shown in just a few corners of the ID document.

The ID document 10 can be formed using a core material such as PVC, TESLIN, polycarbonate (PC), etc. Image 12 is preferably a color image, but the present invention is not limited to such. The document optionally includes ghost image 18, which can be a screened-back or "Ghost" version of image 10. Ghost image 18 is can be visible under normal viewing conditions or may be a "cover" image, visible only under appropriate conditions (e.g., light, temperature, etc.). We note that an ID document 10 need not include all of the features shown in FIG. 1A, and that the illustrated features are provided by way of example. Additional features may, for example, include magnetic stripes, digital watermarks, optically variable devices (OVD's), tactile features (e.g., those made by laser engraving), etc. These features, along with the positioning or embedding of the features, are optional, and are not required to practice the present invention.

FIG. 3A is a cross sectional view of the identification document 10 of FIG. 1, taken along the A-A line. As FIG. 3A illustrates, the identification document 10 is made up of a core layer 50 sandwiched between layers of laminate 56 and overlaminate 60. The core layer 50 can be preprinted with fixed information 52, such as the name of the issuer (for example, in FIG. 1A the fixed information includes the issuer "STATE OF MASSACHUSETTS". A layer of a first type of adhesive 54 joins the laminate 56 to the core layer 50 (alternately, if the core layer 50 and laminate 56 are substantially miscible (e.g., the same material), the layer of first type of adhesive 54 can be eliminated). Personalized information 58, such as demographic data 16, bearer image 12, bar code 15, etc., can be printed or formed onto (or into) laminate layer 56 by any of the methods previously described (e.g., printing, laser engraving, etc., as described herein). In this example, the personalized information 58 is formed using D2T2 printing.

The overlaminate 62 (which may include a security pattern 17) is joined to the laminate 56 by a second adhesive layer 60 that includes at least a portion of the inventive material described herein. For example, in one embodiment, the entire second adhesive layer 60 comprises inventive material. In an advantageous embodiment, the inventive material comprising the entire second adhesive layer 60 is an adhesive formulation containing 50-99% of a thermally active low glass transition temperature ($T_g$) polymeric resin and 1-50% of a multifunctional crystalline polymer. We have found that a particularly advantageous embodiment of the invention uses, for the second adhesive layer 60, a formulation containing about 5-20% tri-functional polyester (e.g., Vitel 5833) and 1-50% of a multifunctional crystalline polymer. The layer 60 also can be constructed such that only portions of it contain the inventive material, and the remainder is another material, such as a material similar to the first adhesive 54. For example, the inventive material can be a pattern formed within the layer 60.

Note also that the overlaminate 62 and second adhesive layer 60 can be coupled together as a single product, before lamination, and then laminated to the card.

Figure 2:
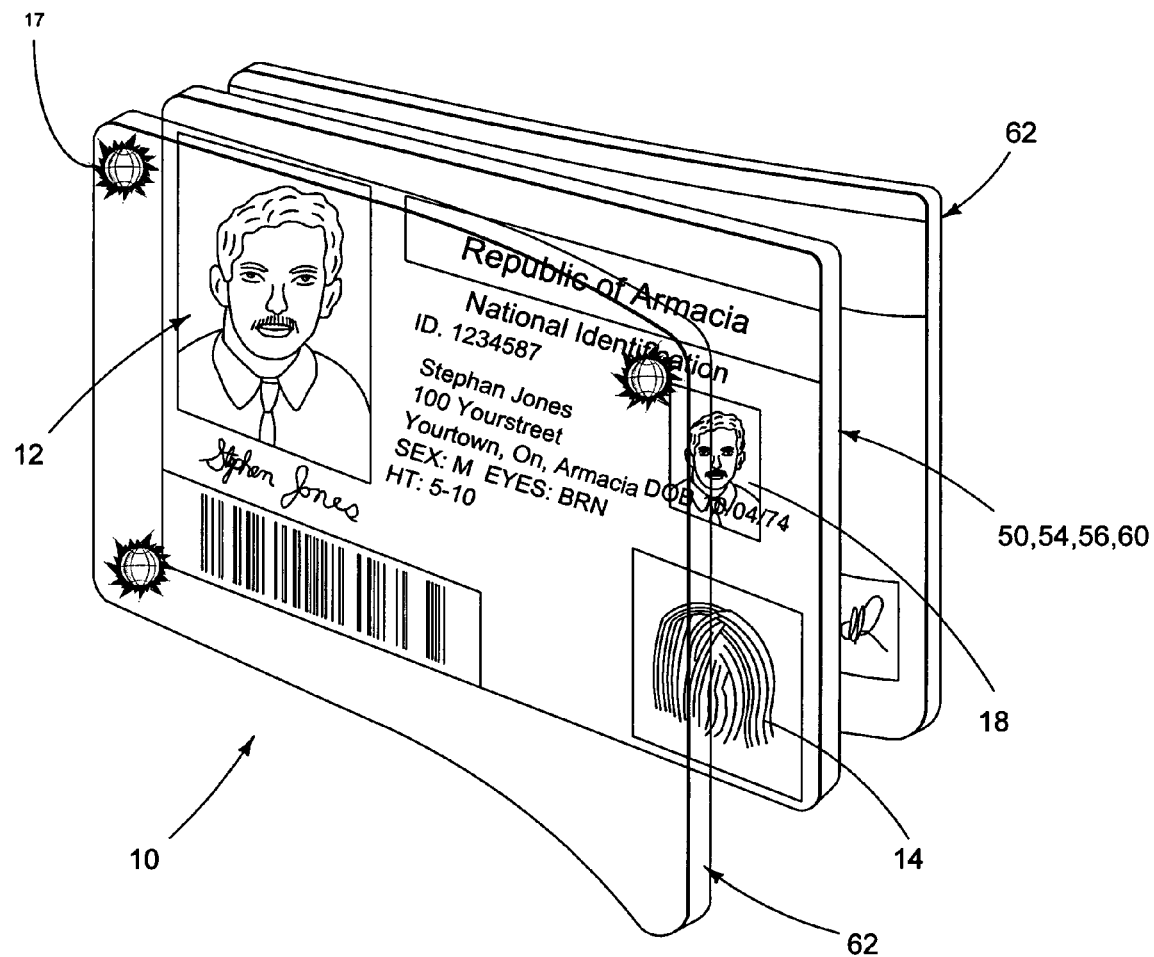
FIG. 2 is a partially exploded perspective view of an identification document similar to the one of FIG. 1A.

During an attempt at intrusion, an intruder may attempt to remove or lift the overlaminate 60, as shown in FIG. 2, to get at the personalized information formed on the card. Heating the ID document to relatively high temperatures can sometimes permit the overlaminate 60 to be lifted, as can application of certain chemicals. Often, because the overlaminate contains security patterns 17 that are very difficult to replicate or purchase, the intruder will not completely remove the overlaminate 60, but will instead lift it, alter part or all of the information (e.g., by replacing photos, changing data, etc.), then relaminate the overlaminate to the remaining card structure (shown in FIG. 2 as 50, 54, 56, 60. If heat is used to attempt to lift the overlaminate 60, temperatures above a predetermined temperature (in the example of Vitel 5833, about 220 degrees Fahrenheit), will cause visible crystals to form that will remain visible even if the overlaminate 60 is successfully reattached. If a chemical is used to lift the overlaminate 60, the heat of re-laminating the overlaminate 60 likely still will cause crystals to form.

As those skilled in the art will appreciate, the inventive material can be adapted to have different "predetermined temperatures" of crystallization, and these predetermined temperatures can be kept confidential. A counterfeiter likely will not know that using conventional heat and lamination processes will cause crystallization, and he or she may not have access to equipment that can enable lamination in the limited "non crystallizing" effective range.

FIG. 3B is an illustrative example showing the identification document of FIG. 1A after a portion of it (the portion overlaying the bearer image 12 and signature disposed below it) were heated to a predetermined temperature (in this example, 220 degrees Fahrenheit). As FIG. 1 illustrated, a plurality of crystals 20 are visible on the card in the portion that was heated. These crystals 20 form in the layer 60, as shown in FIG. 3B. It should be understood that the appearance, size, and location of the crystals 20 are provided by way of example only and are not intended as limiting. The crystals 20 need not be the same size as each other and need not be evenly distributed or oriented. The crystals 20 may be much smaller or much larger than shown in FIGS. 1B and 3B, but they will be visible, whether alone or as a pattern, to the naked eye. Even if the peeled layer of FIG. 2 is successfully relaminated, the crystals will be visible if the relamination occurs above a certain temperature.

Thus, use of the multifunctional crystalline polymer can help to provide further visible evidence of tampering, especially if the attempted tampering used temperatures above 220 degrees Fahrenheit. One example of a multifunctional crystalline polymer that is used in at least some embodiments of the invention is VITEL 5833, which is a low molecular weight, highly functional branched polyester with high crystallinity.

The above described "snow flake like" crystals can be visible to the naked human eye and, in at least one embodiment, are substantially irreversible (e.g., once formed into the material after heating, they remain visible there). The appearance of the crystals provides visual evidence of possible tampering of the ID document (such as an attempt by the counterfeiter to delaminate an overlaminate in an attempt to alter information on the ID document), because the crystals ordinarily would not be visible in the material unless the material has been exposed to temperatures above a predetermined level (e.g., in one embodiment, about 220 degrees Fahrenheit or above).

Of course, as those skilled in the art will appreciate, further modifications to the ID document can work together with the second adhesive layer 60 disclosed herein to further provide evidence of tampering. For example, if the variable or personalized information or indicia is an image (e.g., the image of the ID document bearer), the image can be printed so that it includes a feature that is difficult to replicate and/or re-align after an attempted de-lamination and re-lamination, such as a pattern of fine lines, guilloche, interlocking patterns of colors, moiré patterns, etc. We also expressly contemplate that the second adhesive layer 60 can be used with indicia that are printed using a cohesively failing ink, such as that described in commonly assigned U.S. patent application Ser. No. 10/329,315 (now Publication no. 2003-0226897), entitled "Ink with Cohesive Failure and Identification Document Including Same", the contents of which are hereby incorporated by reference.

The thickness of the applied material in second adhesive layer 60 is not important, and those skilled the art will appreciate that the thickness can be varied to suit different configurations of ID documents. For example, we have found that thicknesses of between 0.1 and 15 microns to be advantageous when used on ID documents such as ISO-compliant ID cards.

It also should be noted that the second adhesive layer 60 can be provided adjacent to ANY type of indicia on an ID document, fixed or variable, and that the use of variable indicia herein is provided merely by way of illustration. As those skilled in the art appreciate, tampering and/or counterfeiting of ID documents is not limited to actions taken with respect to variable indicia, but also can include actions taken with fixed indicia, as well.

We expressly anticipate that the invention also may be adapted to work with non-printed and non-laser engraved indicia on ID documents, such (OVD's), or virtually any feature which can be tampered with.

Concluding Remarks

To provide a comprehensive disclosure without unduly lengthening the specification, applicants herein incorporated by reference each of the patent documents referenced above.

The particular combinations of elements and features in the above-detailed embodiments are exemplary only; the interchanging and substitution of these teachings with other teachings in this and the incorporated-by-reference patent documents are also contemplated.

Having described and illustrated the principles of the technology with reference to specific implementations, it will be recognized that the technology can be implemented in many other, different, forms, and in many different environments.

Figure 3:
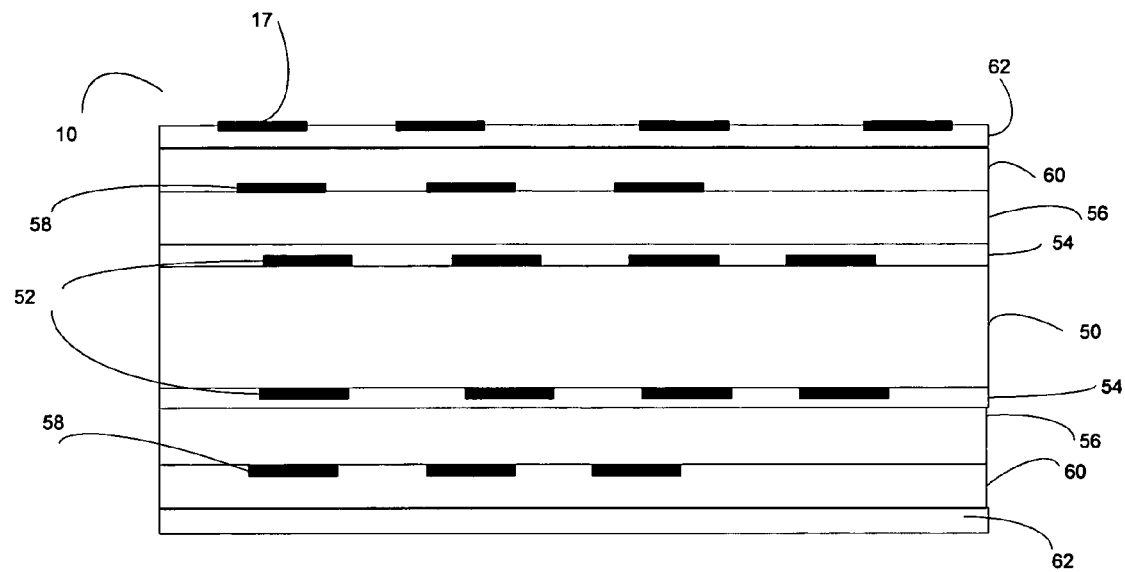
FIG. 3A is a cross sectional view of the identification document of FIG. 1A, taken along the A-A line.
FIG. 3B is a cross sectional view of the identification document of FIG. 2B, taken along the A-A line.
Figure 3:
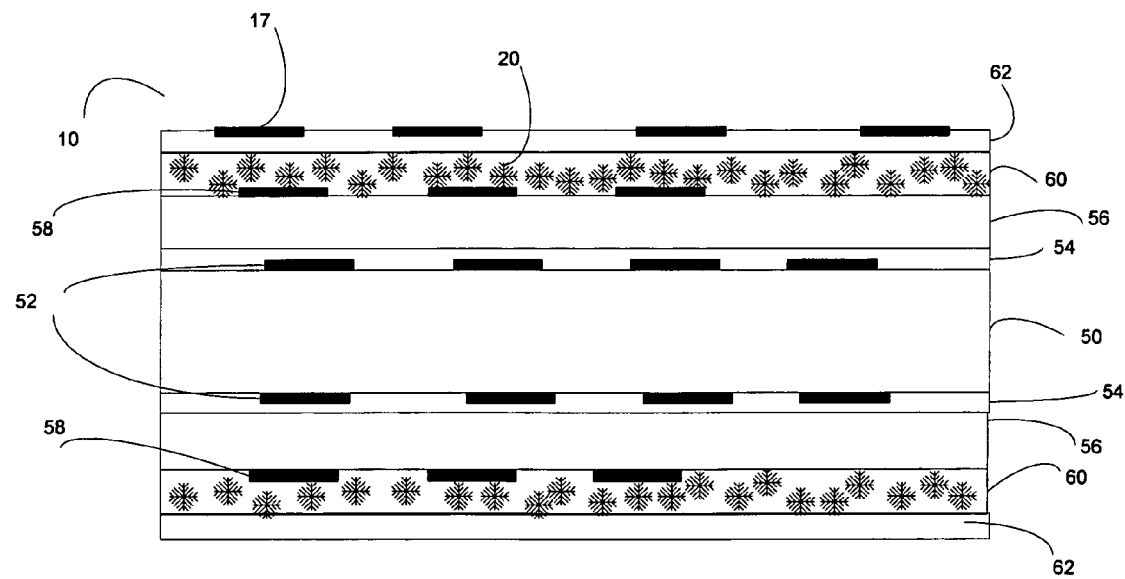

It should be appreciated that while FIGS. 1-3 illustrate a particular species of ID document —a driver's license —the present invention is not so limited. The technology disclosed herein can be used in combination with other technologies. Also, instead of ID documents, the inventive techniques can be employed with product tags, product packaging, labels, business cards, bags, charts, smart cards, maps, labels, etc., etc. For example, we believe the invention may have applicability in providing tamper detectable features for some types of packages.

It should be understood that, in the FIGs of this application, in some instances, a plurality of elements may be shown as illustrative of a particular system element, and a single system element or method step may be shown as illustrative of a plurality of elements. It should be understood that showing a plurality of a particular element is not intended to imply that a composition or article or method implemented in accordance with the invention must comprise more than one of that element or step, nor is it intended by illustrating a single element that the invention is limited to embodiments having only a single one of that respective element. In addition, the total number of elements shown for a particular article (e.g., layers of laminate and/or adhesive) is not intended to be limiting; those skilled in the art will recognize that the number of a particular system element or method steps can, in some instances, be selected to accommodate the particular user needs.

The technology and solutions disclosed herein have made use of elements and techniques known from the cited documents. Other elements and techniques from the cited documents can similarly be combined to yield further implementations within the scope of the present invention. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A composition for adhering a first polymer laminate layer to a second polymer laminate layer, the composition comprising:

a thermally active polymeric resin; and a multifunctional crystalline polymer, wherein the composition maintains adhesion between the first and second polymer layers above a temperature at which a plurality of crystals form within the multifunctional crystalline polymer; wherein the composition forms a plurality of crystals that provide visible evidence of tampering with the adhesion formed between the first and second polymer layers when heated at a temperature above a predetermined temperature.

2. The composition of claim 1, wherein the thermally active polymeric resin comprises a low Tg polymeric resin that comprises 50-99% of the composition.

3. The composition of claim 2, wherein the multifunctional crystalline polymer comprises 1-50% of the composition.

4. The composition of claim 1, wherein the multifunctional crystalline polymer comprises 1-50% of the composition.

5. The composition of claim 1, wherein the multifunctional crystalline polymer comprises 5-20% by weight of the composition.

6. The composition of claim 1, wherein the multifunctional crystalline polymer has a low molecular weight.

7. The composition of claim 1, wherein the thermally active polymeric resin comprises a low Tg polymeric resin that comprises at least one of a high molecular weight low Tg linear amorphous polyester, a polymeric plasticizer, VITEL 3650, polyacrylate, polyethylene vinylacrylate, polyester, and polyurethane.

8. The composition of claim 1, wherein the multifunctional crystalline polymer comprises at least one of a di-functional polyester, a tri-functional polyester, a multi-functional polyester, polypropylene, polyamide, acetal, high density polyethylene, and VITEL 5833.

9. The composition of claim 1, wherein the predetermined temperature is a temperature lower than a standard lamination temperature.

10. The composition of claim 1, wherein the predetermined temperature is about 220 degrees Fahrenheit.

11. The composition of claim 1, wherein the crystals have a "snow flake" like appearance after being subjected to heat above the predetermined temperature, and the "snow flake" like appearance provides evidence of tampering with the adhesion between the first and second polymer layers.

12. An identification document, comprising:
an information-bearing layer;
an adhesive layer overlaying at least a portion of the information-bearing layer, the adhesive layer comprising a thermally active low Tg polymeric resin and a multifunctional crystalline polymer; and
a protective layer coupled to the information-bearing layer via the adhesive layer, wherein the adhesive layer is constructed and arranged such that subjecting the identification document to a temperature above a predetermined temperature causes a plurality of crystals to form in the adhesive layer.

13. An identification document, comprising:
an information-bearing layer;
an adhesive layer overlaying at least a portion of the information-bearing layer, the adhesive layer comprising a thermally active polymeric resin and a multifunctional crystalline polymer; and
a protective layer coupled to the information-bearing layer via the adhesive layer, wherein the adhesive layer is constructed and arranged such that subjecting the identification document to a temperature above a predetermined temperature causes a plurality of crystals to form in the adhesive layer.

14. The identification document of claim 13, wherein the crystal formation is substantially irreversible.

15. The identification document of claim 13, wherein the crystals are visible to an unaided human eye.

16. The identification document of claim 13, wherein the thermally active lot Tg polymeric resin comprises 50-99% of the adhesive layer.

17. The identification document of claim 13, wherein the multifunctional crystalline polymer comprises 1-50% of the adhesive layer.

18. The identification document of claim 13, wherein the multifunctional crystalline polymer comprises 5-20% by weight of the adhesive layer.

19. The identification document of claim 13, wherein the thermally active low Tg polymeric resin comprises at least one of a high molecular weight low Tg linear amorphous polyester, a polymeric plasticizer, VITEL 3650, polyacrylate, polyethylene vinylacrylate, polyester, and polyurethane.

20. The identification document of claim 13, wherein the multifunctional crystalline polymer comprises at least one of a di-functional polyester, a tri-functional polyester, a multi-functional polyester, polypropylene, polyamide, acetal, high density polyethylene, and VITEL 5833.

21. A laminate for a document comprising:
an outer-laminate layer; and
an adhesive layer including a thermally active polymeric resin, and
a multifunctional crystalline polymer; wherein the adhesive layer maintains adhesion between the outer-laminate layer and an information bearing document layer above a temperature at which a plurality of crystals form within the multifunctional crystalline polymer: and wherein subjecting the laminate to a temperature above a predetermined temperature causes a plurality of crystals to form in the adhesive layer.

* * * * *

UNITED STATES PATENT AND TRADEMARK OFFICE
CERTIFICATE OF CORRECTION

PATENT NO. : 7,744,002 B2 Page 1 of 1
APPLICATION NO. : 11/078655
DATED : June 29, 2010
INVENTOR(S) : Robert L. Jones et al.

It is certified that error appears in the above-identified patent and that said Letters Patent is hereby corrected as shown below:

On Title Page, section (73), line 2, delete "Billierca" and replace with --Billerica--

Signed and Sealed this

Thirty-first Day of August, 2010

David J. Kappos
*Director of the United States Patent and Trademark Office*